(12) United States Patent
Smith

(10) Patent No.: US 7,634,785 B2
(45) Date of Patent: Dec. 15, 2009

(54) DVR-BASED TARGETED ADVERTISING

(75) Inventor: Geoffrey R Smith, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 611 days.

(21) Appl. No.: 11/146,816

(22) Filed: Jun. 6, 2005

(65) Prior Publication Data

US 2006/0277569 A1    Dec. 7, 2006

(51) Int. Cl.
*H04N 7/025*  (2006.01)
*H04N 7/10*   (2006.01)
*H04N 7/173*  (2006.01)

(52) U.S. Cl. ............... 725/34; 725/35; 725/102

(58) Field of Classification Search ........... 725/34, 725/35, 102
See application file for complete search history.

(56) References Cited

U.S. PATENT DOCUMENTS

| | | | |
|---|---|---|---|
| 6,698,020 B1 | 2/2004 | Zigmond et al. | |
| 2002/0124249 A1* | 9/2002 | Shintani et al. | 725/32 |
| 2003/0066078 A1* | 4/2003 | Bjorgan et al. | 725/34 |
| 2004/0103429 A1* | 5/2004 | Carlucci et al. | 725/32 |
| 2004/0268384 A1* | 12/2004 | Stone | 725/32 |
| 2005/0060745 A1* | 3/2005 | Riedl et al. | 725/42 |
| 2005/0076359 A1* | 4/2005 | Pierson et al. | 725/32 |
| 2005/0210524 A1* | 9/2005 | Dolph | 725/105 |
| 2005/0283796 A1* | 12/2005 | Flickinger | 725/35 |
| 2008/0059997 A1* | 3/2008 | Plotnick et al. | 725/32 |

* cited by examiner

*Primary Examiner*—John W Miller
*Assistant Examiner*—Chris Parry
(74) *Attorney, Agent, or Firm*—Lee & Hayes, PLLC

(57) ABSTRACT

DVR-based targeted advertising is described. In an embodiment, a targeted advertisement system includes a DVR, an advertisement data store, and an advertisement manager. The DVR records media content, maintains the recorded media content for on-demand viewing, and provides the recorded media content for viewing when requested. The advertisement manager designates advertisement region(s) in the recorded media content as the media content is being recorded, where an advertisement region includes a first boundary and a second boundary to designate the advertisement region in the media content. The advertisement manager monitors a first data stream of the recorded media content when it is rendered for viewing to detect that a playback position of the first data stream has crossed an advertisement region boundary, and to initiate that an advertisement obtained from the advertisement data store be provided as a second data stream to render the advertisement for viewing.

15 Claims, 8 Drawing Sheets

DVR-BASED TARGETED ADVERTISING

BACKGROUND

A main source of revenue for national television broadcasters and their local broadcast affiliates is the sale of broadcast airtime to advertisers that want to promote their goods and/or services. Similarly, cable network providers derive income from the sale of advertising time and cable subscription fees. Advertisers intend to target those viewers that are likely to be interested in their products and/or services. One common technique is to target viewers according to a particular type of television programming. For example, an advertiser may determine that men who watch sports are more likely to purchase a pickup or sport utility vehicle rather than another type of automobile. Accordingly, the advertiser may then purchase advertising space during a broadcast of a football game. Another common technique to target viewers is according to geographic area. For example, viewers in one local or regional area may likely be more interested in goods and/or services from a particular advertiser than viewers in a different area.

"Local ad insertion" is a business practice used by television affiliates, re-broadcasters, and service providers to sell advertising airtime for a limited geographical area. Local ad (i.e., advertisement) insertion was originally designed for analog television media and each different geographical area where advertisements can be inserted at the service level requires a different service to be continually available for each of the different local advertisements. The services, however, will carry the same content nearly all of the time, and only differ when local advertisements are inserted for a brief period of time. A standard released by the Society of Cable Television Engineers for program substitution and advertisement insertion for MPEG-2 broadcast systems is ANSI/SCTE 35 which details how splice points can be transmitted directly in an MPEG-2 transport stream. SCTE-35 is utilized for local ad insertion for MPEG-2 content.

Targeted advertising is a recent innovation that attempts to match up particular zip codes, households, or even individuals with different, targeted versions of advertisements. However, targeted advertising systems use current techniques adapted from, or intended for, local ad insertion to splice advertisements into a broadcast feed. The same inefficiencies of having to provide and maintain a separate copy of the service for each target area requires, and may exceed, hardware and bandwidth availability. Further, splicing for data stream substitution is a deficient technique for targeted advertising, independent of the delivery mechanism.

With the advent of digital video recorders, targeted advertisements that may be effective when initially distributed with broadcast content are likely ineffective when a viewer watches a recording of the program at some later date. Digital video recorders merely accentuate the problems that advertisers faced with VHS systems and later viewings of recorded programs. For example, a flower shop may purchase advertising time to include advertisements before Mother's Day along with a broadcast of a program. If the program is recorded, such as with a digital video recorder, and watched after Mother's Day, however, then the advertisements are ineffective and the associated advertising expenses are lost. Additionally, targeted advertising which is typically based on television programming content and/or geographic regions is still broadcast to a large percentage of viewers that are not interested in the goods and/or services being advertised. As such, content providers and advertisers both have an incentive to implement better technique(s) to target and deliver advertising messages to specific viewers.

SUMMARY

Digital video recorder (DVR-based) targeted advertising is described herein.

In an embodiment of DVR-based targeted advertising, a targeted advertisement system includes a DVR, an advertisement data store, and an advertisement manager. The DVR records media content, maintains the recorded media content for on-demand viewing, and provides the recorded media content for viewing when requested. The advertisement data store maintains advertisements. The advertisement manager designates advertisement region(s) in the recorded media content as the media content is being recorded, where an advertisement region includes a first boundary and a second boundary to designate the advertisement region in the media content. The advertisement region boundary indicates where to exit from a data stream to render a targeted advertisement, and the second advertisement region boundary indicates where to return for playback of the data stream after the targeted advertisement has been rendered.

The advertisement manager of the targeted advertisement system monitors a first data stream of the recorded media content when it is rendered for viewing to detect that a playback position of the first data stream has crossed, or encountered, an advertisement region boundary in the recorded media content. Detecting that the advertisement region boundary has been crossed in the media content data stream triggers a targeted advertisement when the recorded data stream or an associated content navigable stream is played back at any speed in a forward or reverse direction, such as fast-forward, rewind, skip-ahead, and skip-back. In addition, an advertisement region boundary may also be detected when rewinding the recorded data stream on a local, client-based DVR system such that the second boundary of the targeted advertisement region is crossed before the first boundary of the targeted advertisement region.

The playback system (whether network-based or client-based) can then signal which advertisement region boundary has been crossed, and the advertisement manager can initiate that an advertisement obtained from the advertisement data store be provided as a second data stream to the playback system which renders the advertisement for viewing. The DVR can again provide the recorded media content for viewing when requested a second time. The advertisement manager can again detect the advertisement region boundary in a data stream of the recorded media content, and initiate that a different advertisement obtained from the advertisement data store be rendered for viewing to target a particular viewer or viewers.

BRIEF DESCRIPTION OF THE DRAWINGS

The same numbers are used throughout the drawings to reference like features and components.

DETAILED DESCRIPTION

Figure 1:
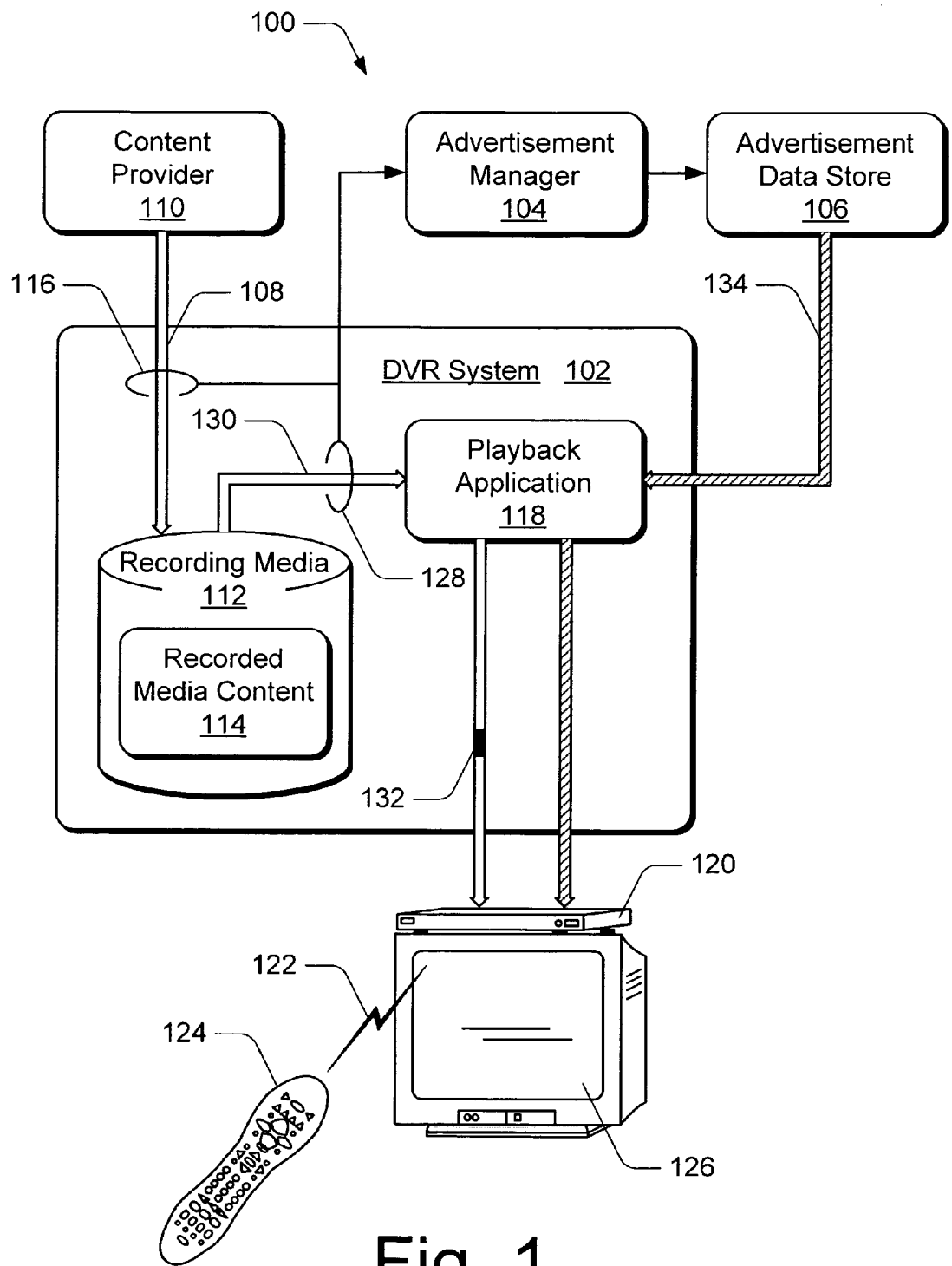
FIG. 1 illustrates an exemplary targeted advertisement system in which embodiments of DVR-based targeted advertising can be implemented.

DVR-based targeted advertising is described in which embodiments provide techniques for targeted advertising in a digital video recorder (DVR) and/or IPTV-based system. A viewer can schedule a DVR to record a television program, and the DVR then maintains the recorded program until the viewer selects to have the recorded program played back for viewing. Default advertisements may typically be included in the original broadcast stream for the benefit of viewers without DVR systems, even if the broadcast stream is marked-up to designate advertisement regions that support later DVR-based targeted advertising. The entire broadcast stream can be recorded to the DVR system, including the original advertisements, while the advertisement regions(s) are detected and tracked in the media content as the television program is being recorded.

When a viewer selects the recorded program to be played back for viewing, advertisements can be targeted to the viewer, or to a group of viewers at the same playback device, at the time when the recorded program is displayed for viewing. As such, the advertisements targeting the viewer(s) are determined when the program is played back, and not at the time when the program was broadcast. For example, the advertisements targeting the viewer(s) can change hourly, daily, weekly, seasonally, and the like if the recorded program is played back more than once. Additionally, advertisements can also be selected based on tracking viewer activity, on an explicit user login, on statistical targeting models, viewer profiles, and/or any other technique, strategy, model or combination thereof designed to identify an advertisement that is most likely to elicit a viewer response and/or generate revenue.

When the recorded program is played back for viewing, and when a playback position of the data stream is detected to cross, or encounter, an advertisement region boundary, an advertisement can be obtained from an advertisement data store to target the viewer that has requested and is likely viewing the recorded program. An advertisement region boundary can be detected when the data stream is navigated in advance (e.g., play, fast-forward, or skip-ahead), or when the data stream is navigated in reverse (e.g., rewind or skip-back). Advancing the data stream, for example, may also allow a viewer to skip or fast-forward into an advertisement region of the data stream, in which case the corresponding remaining portion of the advertisement can be rendered for viewing, or optionally, the system may default to the beginning of the advertisement region so that the entire advertisement will be displayed. The targeted advertisement is not spliced into the recorded data stream of the media content, but rather is provided as a second data stream that is decoded and processed independent of the recorded data stream to display the advertisement for viewing. In an embodiment of DVR-based targeted advertising, an advertisement region can be detected in the data stream of media content by parsing standard SCTE-35 protocol signals that are conventionally used to trigger splicing an advertisement for local ad insertion into a live broadcast.

In an implementation of DVR-based targeted advertising, the recorded program and the targeted advertisement are played back for viewing at the regular playback data rate. In an alternate implementation, however, an advertisement region boundary can be encountered (or tracked) when the media content is being played back at any speed in a forward or reverse direction, such as fast-forward, rewind, skip-ahead, and skip-back. When the media content is being played back at other than the normal playback data rate, the DVR system can implement DVR-based targeted advertising by playing back the targeted advertisement in a similar mode to the one being used for playback of the media content stream (e.g., fast-forward through the targeted advertisement at the same speed that the media content is being fast forwarded through). Optionally, the DVR system can be implemented to always playback a targeted advertisement at the "normal" playback rate, and then resume the original playback speed of the media content upon completion of the targeted advertisement. Additionally, for DVR-based targeted advertising with recorded content, the duration of the targeted advertisement (or other designated content) can exceed or be less than the length of the advertisement region in the original stream of media content.

If the recorded program is again requested for viewing, the DVR can provide the data stream of the recorded media content to be played back again for viewing. The advertisement region boundary can again be detected in the data stream of the media content, and a different advertisement can be obtained from the advertisement data store to target the viewer who has requested the recorded program for an additional viewing. It should be noted that the viewer who requests the recorded program for the additional viewing may or may not be the same individual who originally selected the recorded content for playback. This provides that different advertisements can be targeted to the same or different viewer(s) when recorded media content (e.g., programs, movies, and the like) is played back for viewing, and not when the media content is recorded. As such, a content provider, such as a cable operator or headend service, can sell advertisement regions to target a particular viewer or group of viewers, or for particular time slots or designated advertisement regions associated with a particular program so that if the program is being viewed from a DVR recording, the targeted advertisements can still be displayed to the viewer.

While aspects of the described systems and methods for DVR-based targeted advertising can be implemented in any number of different computing systems, environments, television-based entertainment systems, and/or configurations, embodiments of DVR-based targeted advertising are described in the context of the following exemplary system architectures.

FIG. 1 illustrates an exemplary targeted advertisement system 100 in which embodiments of DVR-based targeted advertising can be implemented. In this example, the targeted advertisement system 100 includes a DVR system 102, an advertisement manager 104, and an advertisement data store 106. Any one or combination of the components described with reference to system 100 can be implemented in a television-based client device, as described with reference to FIG. 2, to implement embodiments of DVR-based targeted advertising. Additionally, any one or combination of the components described with reference to system 100 can be implemented in a network-based content provider, as described with reference to FIG. 4, to implement embodiments of DVR-based targeted advertising. An exemplary television-based system 800 that includes both a network-based content provider and television-based client devices is described further with reference to FIG. 8.

The advertisement data store 106 can be implemented as any combination of different memory component(s) to maintain, or otherwise store, advertisement data received from any advertisement provider. The stored advertisement data can correspond to advertisements that include any form of audio, video, image content, and/or any combination thereof. The DVR system 102 records media content 108, such as any form of movies, programs, music, and similar audio, video, and/or image content that may be broadcast or otherwise received from a content provider 110. The DVR system 102 also includes recording media 112 which can be implemented as any one or combination of different computer readable media to maintain, or store, the media content 108 as recorded media content 114.

The advertisement manager 104 can be implemented to monitor 116 the media content 108 as it is being recorded and designate advertisement regions in the media content. An advertisement region can include a first boundary and a second boundary to designate the advertisement region in the recorded media content. The advertisement regions each identify a location in the media content that designates when an advertisement is to be separately rendered as the recorded media content is being rendered for viewing. The advertisement region boundaries indicate where to exit from a data stream of the media content to render a targeted advertisement, and where to return for playback of the data stream after the targeted advertisement has been rendered.

It should be noted that a data stream of a targeted advertisement may also include an additional advertisement region designated by a first and second boundary. For example, a recorded program may be played back for viewing (i.e., a first data stream), and an advertisement region encountered to indicate playback of a thirty-second advertisement. The advertisement may then be played back as a twenty-second advertisement (i.e., a second data stream) that includes an additional advertisement region to indicate playback of a customized ten-second addition to the twenty-second advertisement (i.e., a third data stream). For example, a financial program may include an advertisement for a finance company offering lower mortgage rates, and the advertisement may itself include a short section about specific mortgage rates targeted to a particular region.

The ANSI/SCTE-35 standard pertaining to program substitution and advertisement insertion for MPEG-2 broadcast systems details how splice points can be transmitted directly in an MPEG transport stream, and in an embodiment, the SCTE-35 standard can be utilized to implement embodiment(s) of DVR-based targeted advertising. A standard inband SCTE-35 protocol signal can be detected as the signaling mechanism to trigger the advertisement manager 104 to obtain an advertisement from the advertisement data store 106. SCTE-35 utilizes a program out point to indicate the beginning of an advertisement insertion splice, and a program in point to designate the end of the advertisement insertion splice. The enter and exit points for SCTE-35 are significant to indicate timing and a directionality for splicing advertisements into MPEG-2 data streams. Contrary to the direction-based program points in SCTE-35, DVR-based targeted advertising implements techniques (in one embodiment) to recognize a program out point and a program in point as advertisement region boundaries that are not limited by timing or content playback direction. Either of the advertisement region boundaries can be designated as the start of an advertisement region or as the end of the advertisement region, depending upon the navigation direction of the media content.

It should be noted that DVR-based targeted advertising is not limited to the SCTE-35 protocol for MPEG-2 data. As such, any signaling system can be implemented for any type of data in DVR-based targeted advertising. For example, in-band signaling can be utilized to communicate metadata which is information associated with a program that can indicate, or limit, which type of advertisements can be played back for viewing during the program. For example, advertisements for a "family-based" program may have associated information that indicates advertisements which include violent or adult content can not be rendered for viewing during the program. Information associated with a program can designate any number of possible playback limitations, such as who and when to target the advertisement.

In this example, the DVR system 102 also includes a playback application 118 via which the DVR system 102 provides the recorded media content 114 for viewing when requested. For example, a viewer may initiate a request to view a recorded movie, and the playback application 118 controls the distribution and/or playback of the recorded movie. The targeted advertisement system 100 includes a television-based client device 120, an example of which is described with reference to the exemplary computing device 700 shown in FIG. 7 (when computing device 700 is implemented as a television-based client device).

The playback application 118 can be implemented to receive a media content navigation input 122, such as from a user-operated remote control device 124. A media content navigation input 122 can include a command to play the media content (e.g., start a program for viewing), pause or stop the media content, advance the media content (to include fast-forward and skip-ahead), reverse the media content (to include rewind and skip-back), or any other similar media content navigation command. The recorded media content 114 can be marked, or otherwise include indicators, such that any time an advertisement region boundary is crossed, even when in fast-forward, rewind, or skip modes, an advertisement can be obtained and rendered for viewing at the designated advertisement region.

A requested recording, such as for the recorded media content 114, can be routed from the recording media 112 to the playback application 118, and to the client device 120 where the media content can be decoded and displayed for viewing on a display device 126, such as a television. The advertisement manager 104 can also be implemented to monitor 128 the recorded media content 114 when routed as a data stream 130 to be rendered for viewing, such as on the display device 122. Additionally, the advertisement manager 104 can detect that a playback position in the data stream 130 (e.g., of the recorded media content 114) has crossed or encountered an advertisement region boundary 132, obtain an advertisement from the advertisement data store 106, and initiate that the advertisement be routed to the playback application 118 as a separate data stream 134 to render the advertisement for viewing.

The advertisement manager 104 can obtain an advertisement from the advertisement data store 106 to target a particular viewer or a group of viewers based on a likelihood that the viewer(s) requested the recorded media content 114 for viewing. The advertisement can also be obtained from the advertisement data store 106 to target the viewer(s) based on a time of the day when the recorded media content is rendered for viewing, a day of the week, a location of a client device that renders the recorded media content and the advertisement for viewing, and/or based on any type of criteria, filtering, demographics, or any combination thereof to determine which advertisements target the viewer(s). For example, a program may be played back for viewing during the daytime and advertisements can be targeted on an assumption that kids may be watching the program. If the same program is played back in the late evening, however, the advertisements can be targeted for an adult. Additionally, if a program is initially recorded in the Summer and would have included swimsuit advertisements, but the program is not played back for viewing until the Winter, different advertisements other than for swimwear can be targeted to the viewer(s).

Although illustrated and described as two separate applications, the advertisement manager 104 and the playback application 118 can be implemented together as a single application in a television-based client device 120, or in a network-based content provider 110. Alternatively, the advertisement manager 104 and/or the playback application 118 can each be implemented as several distributed component applications to implement embodiments of DVR-based targeted advertising.

The techniques for DVR-based targeted advertising provide that the DVR system 102 can again provide the same recorded media content 114 for viewing when requested a second time. For example, a viewer may record and watch a movie, and then a month or some other time later, initiate another viewing of the movie. The advertisement manager 104 can again detect 128 an advertisement region boundary in the recorded media content 114, and initiate that a different advertisement obtained from the advertisement data store 106 be routed as a separate data stream through the playback application 118 to be rendered for viewing. Regardless of whether a program (e.g., the media content) is being viewed from a live broadcast or from a DVR recording, an advertisement that is displayed in a particular DVR recording can change over time as new advertisements are provisioned in the advertisement data store 106.

Figure 2:
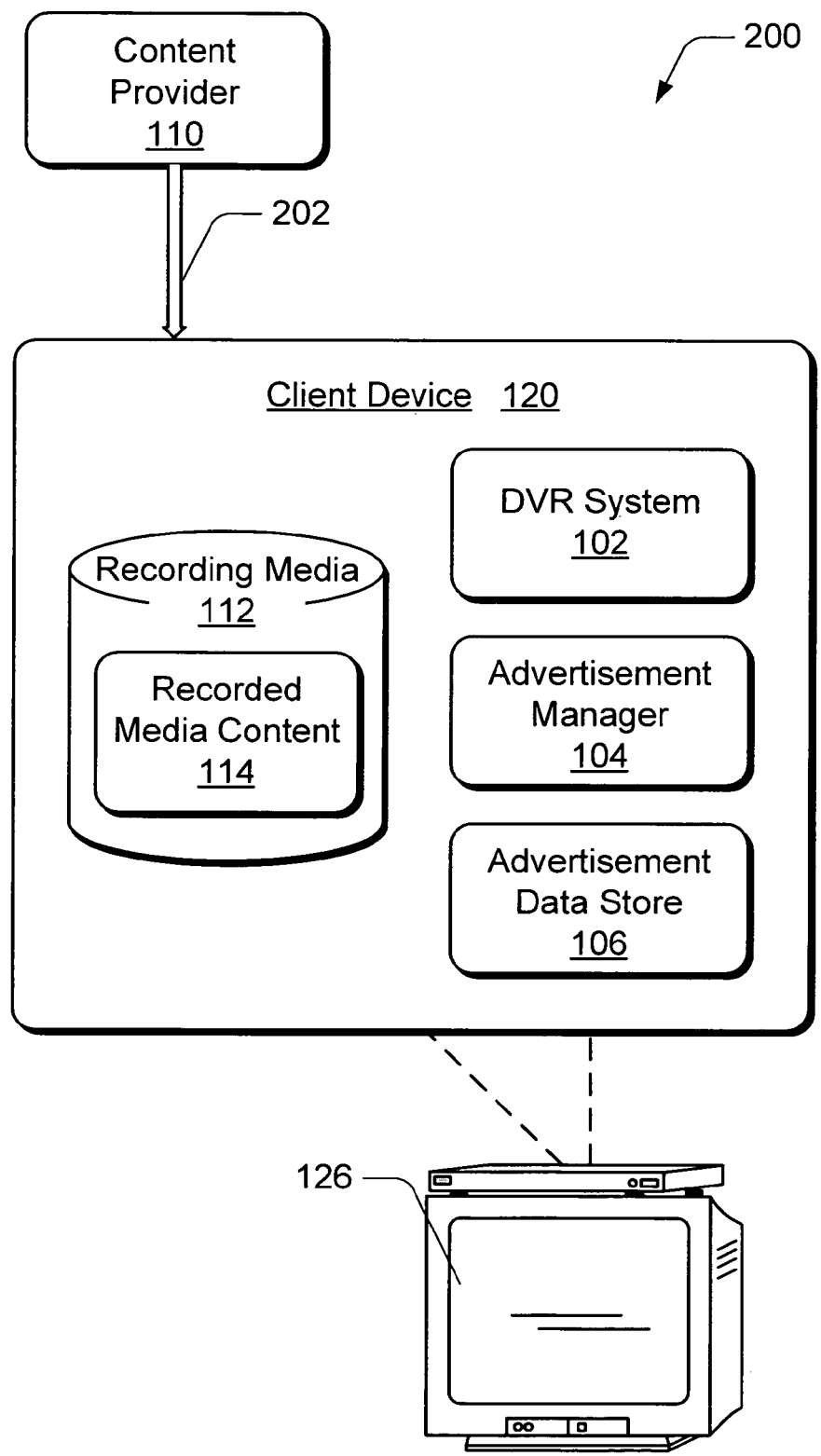
FIG. 2 illustrates an exemplary targeted advertisement system in which embodiments of DVR-based targeted advertising can be implemented with a television-based client device.

FIG. 2 illustrates an exemplary targeted advertisement system 200 in which the components described with reference to the system 100 shown in FIG. 1 are implemented in the television-based client device 120. System 200 includes the content provider 110 and the client device 120 each configured for communication via a communication network 202. In an embodiment, the communication network can be implemented as an IP-based network as described with reference to the television-based system 800 shown in FIG. 8. In this example, the client device 120 includes the DVR system 102, the advertisement manager 104, the advertisement data store 106, and the recording media 112 which maintains the recorded media content 114.

The content provider 110 can be implemented to periodically communicate different advertisements and associated advertisement playback information to the client device 120 via the communication network 202. The associated advertisement playback information can include metadata that indicates which advertisement should be played back for a particular advertisement region in the media content and/or under what circumstances. The different (or replacement, or additional) advertisements, as well as the associated advertisement playback information, are maintained in the advertisement data store 106 and can be provided to target a particular viewer or viewers associated with the television-based client device 120.

The client-based DVR 120 can receive a media content navigation input, such as a rewind or fast-forward navigation input, from a user-operated remote control device (e.g., remote control device 124 shown in FIG. 1). In response to the "trick mode" input (e.g., the content navigation input), the DVR system 102 renders frames of the data stream according to the navigation input. When a rewind navigation input is received and the data stream of the recorded media content is displayed as rewinding, the DVR system 102 can detect a second boundary of a targeted advertisement region in the data stream and recognize that the second boundary of the advertisement region is crossed before the first boundary of the advertisement region. The DVR system 102 can then obtain an advertisement from the advertisement data store 106 and play back the advertisement in reverse order, or optionally, playback the targeted advertisement for normal playback viewing (and then resume rewinding the recorded media content upon playback completion of the targeted advertisement).

The different advertisements can be provided based on any type of criteria, filtering, demographics, and/or any combination thereof to determine which advertisements to target to the particular viewers. Advertisement selection criteria is described in greater detail in U.S. Pat. No. 6,698,020 entitled "Techniques for Intelligent Video Ad Insertion", issued Feb. 24, 2004 to Zigmond et al., the disclosure of which is incorporated by reference herein for the purpose of implementing DVR-based targeted advertising.

Advertisements and/or the associated playback information can be pre-provisioned in the advertisement data store 106 by communicating the advertisements to the client device 120 via an HTTP trickle stream, by delivery of portable media containing the advertisements directly to a location of the client device 120, with a burst transmission of the advertisements via the communication network 202 during off-peak hours, and/or by any other advertisement distribution scheme. In an embodiment, an advertisement selection mechanism can leverage the SCTE-35 protocol because it provides the splice and timing program points which can correspond to the advertisement region boundaries to designate when to obtain or select an advertisement from the advertisement data store 106. The client device 120 can be implemented to acquire and parse the SCTE-35 data, and also to switch to a data stream of advertisement content loaded from the DVR system 102, and then switch back to a return location in the initial data stream of media content. It should be noted, however, that DVR-based targeted advertising is not limited to the SCTE-35 protocol for MPEG-2 data. As such, any signaling system can be implemented for any type of data, to include out-of-band, pre-cached data downloaded over HTTP, and tags embedded in a closed captioning stream.

Methods for DVR-based targeted advertising, such as exemplary methods 300 and 500 described with reference to respective FIGS. 3 and 5 may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 3:
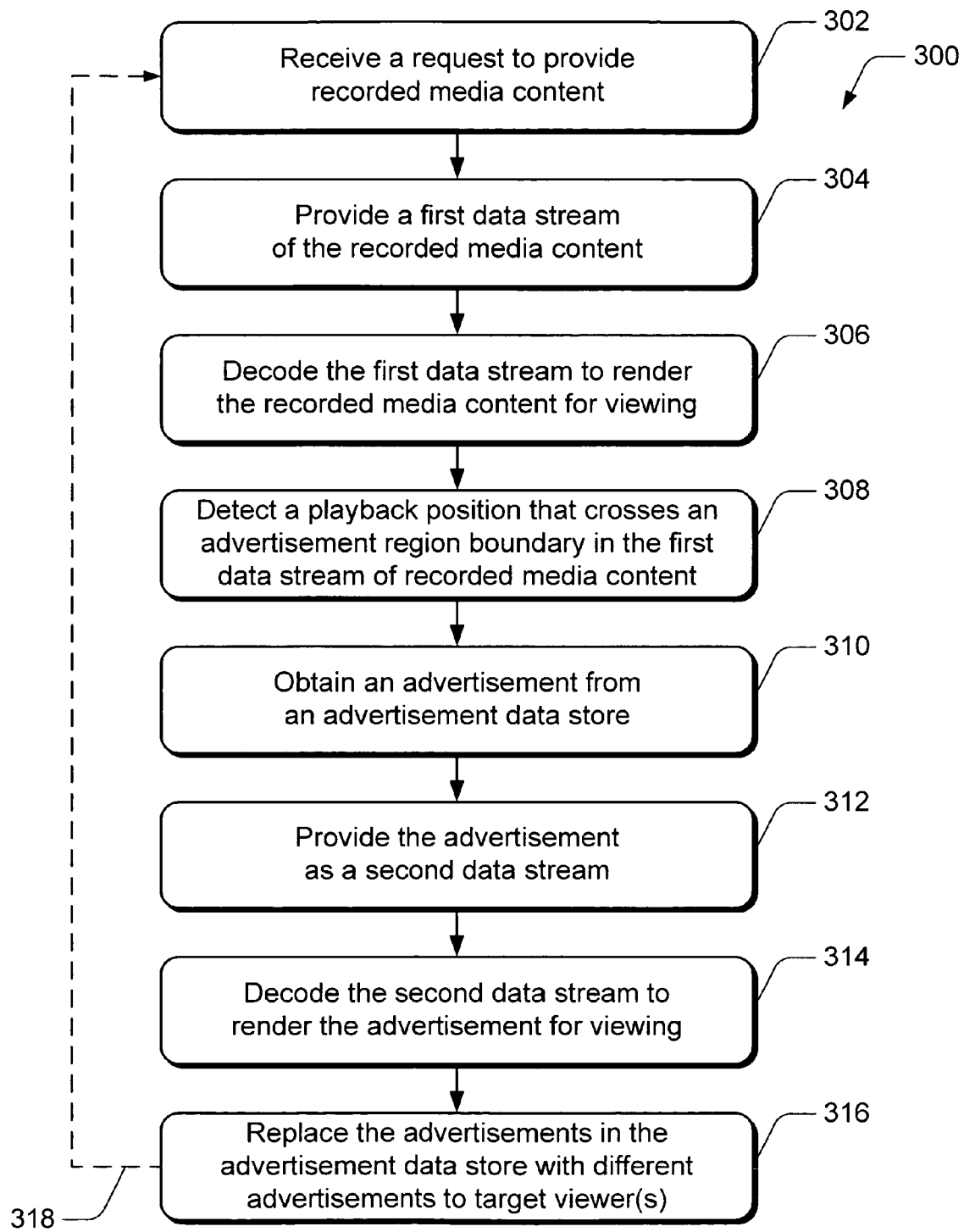
FIG. 3 illustrates an exemplary method for DVR-based targeted advertising and is described with reference to FIGS. 1 and 2.

FIG. 3 illustrates an exemplary method 300 for DVR-based targeted advertising, and is described with reference to a television-based client device that includes components to implement DVR-based targeted advertising as described with reference to FIGS. 1 and 2. The order in which the method is described is not intended to be construed as a limitation, and any number of the described method blocks can be combined in any order to implement the method. Furthermore, the method can be implemented in any suitable hardware, software, firmware, or combination thereof.

At block 302, a request is received to provide recorded media content. For example, client device 120 receives a user input 122 from remote control device 124 to render a recorded program for viewing. At block 304, the recorded media content is provided as a first data stream, and at block 306, the first data stream is decoded to render the recorded media content for viewing. For example, the DVR-based system 102 receives the recorded program from the recorded media content 114 as data stream 130 and decodes the data stream to render the recorded program for display on a display device, such as television 126.

At block 308, a playback position that crosses, or encounters, an advertisement region boundary is detected in the first data stream of recorded media content when rendered for viewing. For example, the advertisement manager 104 monitors 128 the data stream 130 of the recorded program and detects an advertisement region boundary that designates when an advertisement is to be separately rendered while the recorded media content is being rendered. The advertisement manager 104 can designate the advertisement regions that are later detected in the recorded media content 114 as the media content is being recorded. An advertisement region can include a first boundary and a second boundary to designate an advertisement region in the recorded media content.

At block 310, an advertisement is obtained from an advertisement data store. For example, the advertisement manager 104 obtains the advertisement from the advertisement data store 106 to target a particular viewer based on a likelihood that the viewer requested the recorded media content for viewing, such as a viewer associated with client device 120. The advertisement manager 104 may also obtain the advertisement based on a time of day, a day of the week, or a location of a client device 120 that renders the recorded media content and the advertisement for viewing. Additionally, advertisements can also be selected based on tracking viewer activity, on an explicit user login, on statistical targeting models, and/or any other technique, strategy, model or combination thereof designed to identify an advertisement that is most likely to elicit a viewer response and/or generate revenue.

At block 312, the advertisement is provided as a second data stream, and at block 314, the second data stream is decoded to render the advertisement for viewing. For example, DVR system 102 receives the advertisement from the advertisement data store 106 as data stream 134 and decodes the data stream to render the advertisement for display on television 126 when the playback position encounters the advertisement region boundary while the recorded media content is being rendered. An advertisement region boundary can be encountered when the media content is played back at any speed in a forward or reverse direction, such as fast-forward, rewind, skip-ahead, and skip-back. When the media content is being played back at other than the normal playback data rate, the targeted advertisement can be played back in a similar mode to the one being used for playback of the media content stream. Optionally, the DVR system can be implemented to always playback a targeted advertisement at the "normal" playback rate, and then resume the original playback speed upon completion of the targeted advertisement.

At block 316, the advertisements in the advertisement data store are replaced with different advertisements to target viewer(s). For example, content provider 110 communicates different advertisements to the client device 120 via the communication network 202. The content provider 110 can also communicate associated advertisement playback information that includes metadata which indicates which advertisement should be played back for an advertisement region in the media content and/or under what circumstances. The different advertisements are maintained in the advertisement data store 106 and can be provided to target a particular viewer or viewers associated with the television-based client device 120.

Optionally, method 300 can be repeated at 318 when a subsequent request to provide the recorded media content is received (e.g., at block 302). When a data stream of the requested, recorded media content is again provided, the advertisement manager 104 can again detect the advertisement region boundary in the data stream of the recorded media content (e.g., at block 308). The advertisement manager 104 can then obtain a different advertisement from the advertisement data store 106 (e.g., at block 310) such that the different advertisement is provided as a second data stream to render the advertisement for viewing when the advertisement region is encountered in the data stream of the recorded media content (e.g., at blocks 312-314).

Figure 4:
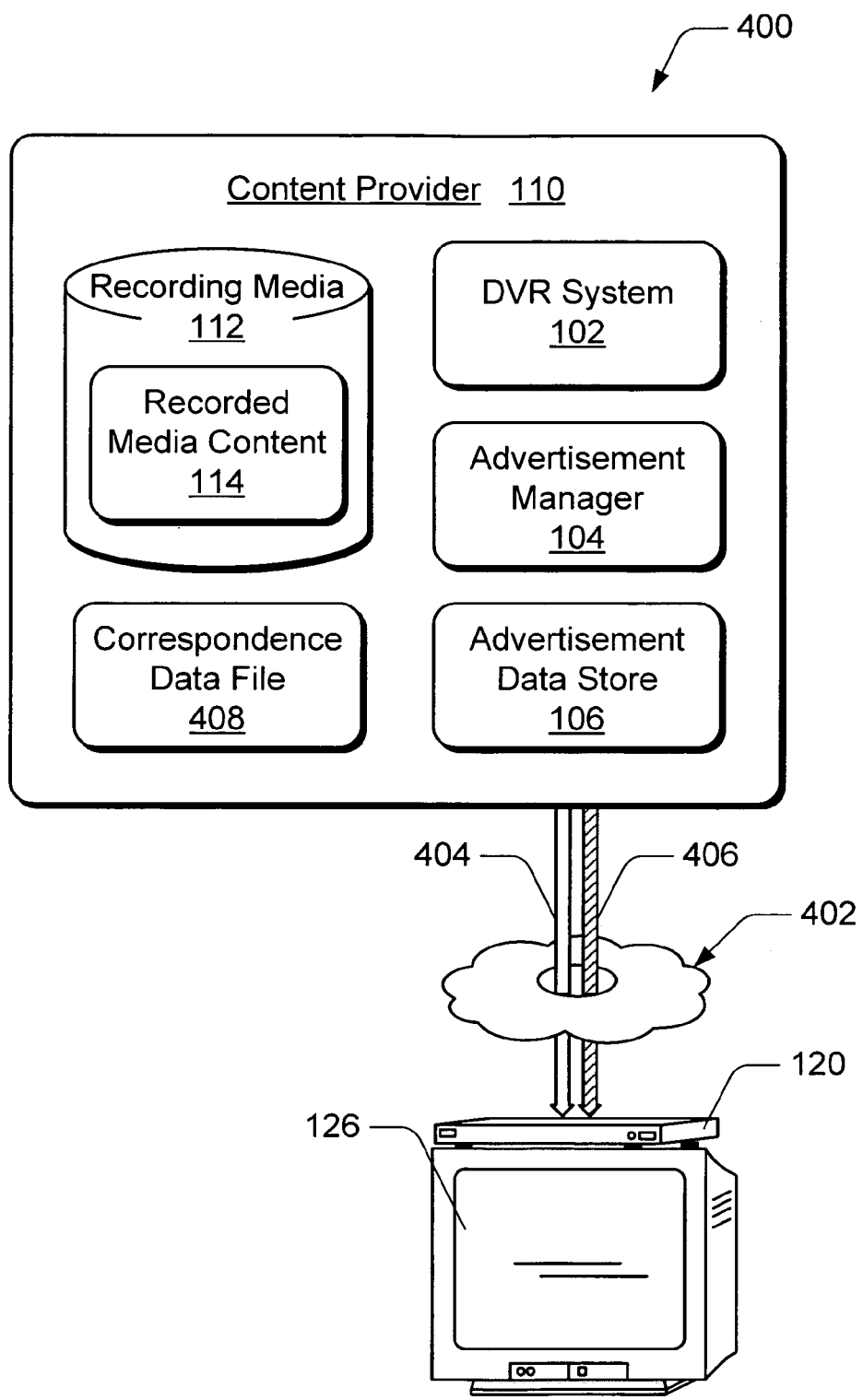
FIG. 4 illustrates an exemplary targeted advertisement system in which embodiments of DVR-based targeted advertising can be implemented with a network-based content provider.

FIG. 4 illustrates an exemplary targeted advertisement system 400 in which the components described with reference to the system 100 shown in FIG. 1 are implemented in the network-based content provider 110. System 400 includes the content provider 110 and the client device 120 each configured for communication via a communication network 402. In an embodiment, the communication network 402 can be implemented as an IP-based network as described with reference to the television-based system 800 shown in FIG. 8.

In this example, the content provider 110 includes the DVR system 102, the advertisement manager 104, the advertisement data store 106, and the recording media 112 which maintains the recorded media content 114. The client device 120 can receive a data stream 404 of recorded media content from the DVR system 102 of the content provider 110 to display a recorded program for viewing when requested by a viewer associated with the client device 120. Additionally, the client device 120 can receive a data stream 406 of advertisement data from the DVR system 102 via the communication network 402 to display a targeted advertisement for viewing by the viewer associated with the client device 120.

The advertisement manager 104 can be implemented to periodically update, or replace, the advertisements and associated advertisement playback information in the advertisement data store 106 with different (or replacement, or additional) advertisements. The different advertisements, as well as the associated advertisement playback information, are maintained in the advertisement data store 106 and can be provided to target viewers associated with television-based client devices. Although only one client device 120 is shown in this example, a television-based system can include any number of client devices that receive media content and advertisements from content provider 110. The different advertisements can be provided based on any type of criteria, filtering, demographics, and/or any combination thereof to determine which advertisements to target particular viewers associated with the respective client devices that receive media content and advertisements from the content provider 110.

The content provider 110 also includes a correspondence data file 408 which is a data file that maps media times across all content navigable streams and a data stream of the recorded media content. The content navigable streams may also be referred to as "trick streams" which are re-encoded streams that have been generated from the original content stream and which play just like an ordinary data stream, but have been encoded at (for example) five times the normal playback speed for a fast-forward command, or (for example) five times the normal playback speed in the reverse direction for a rewind command. A content navigable stream corresponding to a data stream of the recorded media content indicates where to begin playback when switching between the streams.

The advertisement manager 104 can detect an advertisement region boundary when the recorded media content is advanced faster than a normal playback speed (e.g., fast-forward or skip-ahead), or reversed (e.g., rewind or skip-back) in a content navigable stream. The correspondence data file 408 includes presentation time and media time for the advertisement regions, and indicates at various offsets within each content navigable stream, the original media time in the regular play stream that corresponds to the current file offset. The content navigable playback streams can be marked with a first boundary and a second boundary (e.g., entry and exit points, or start and end points) of respective advertisement regions such that the region boundaries are linked to the same original media time across all of the content navigable streams.

Figure 5:
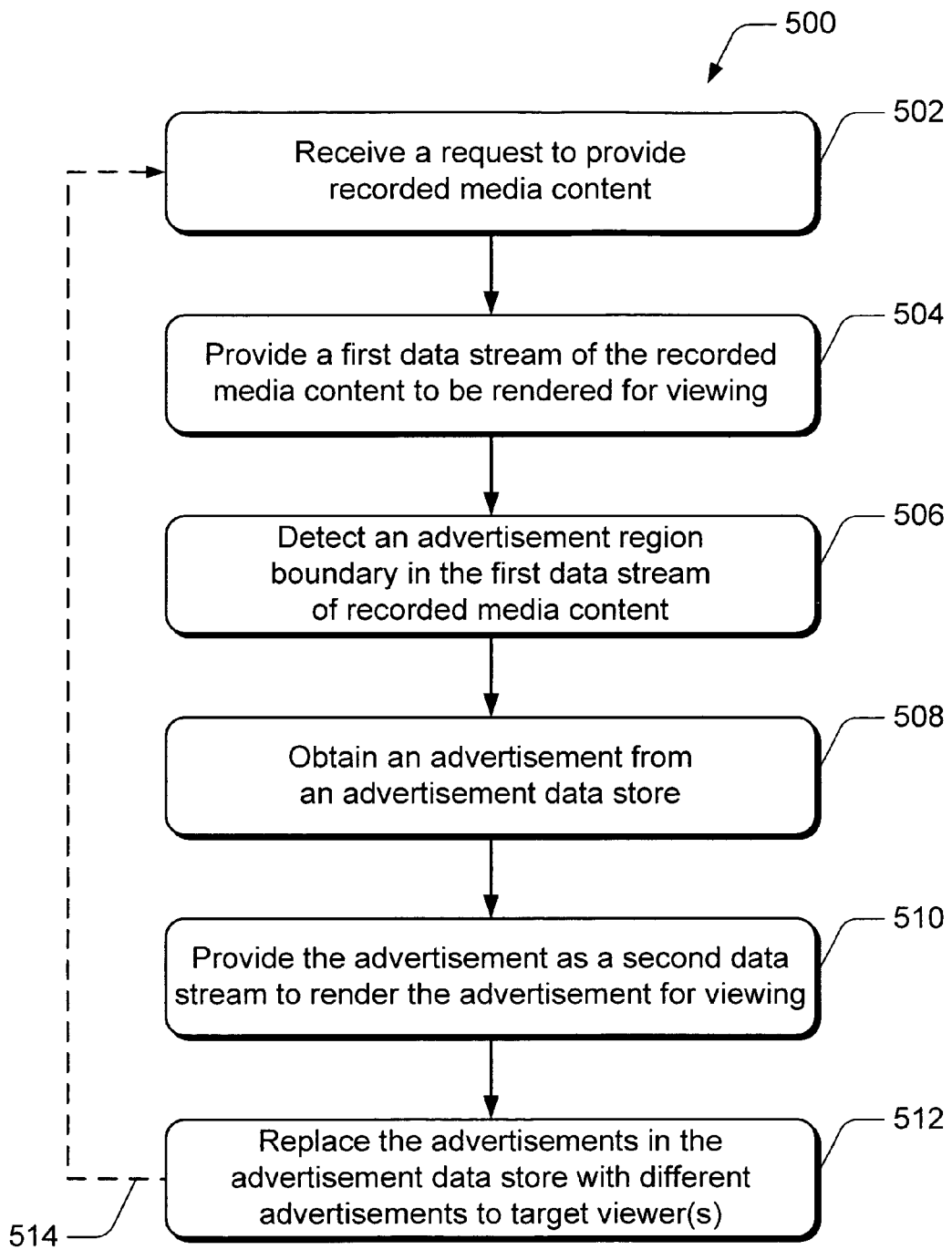
FIG. 5 illustrates an exemplary method for DVR-based targeted advertising and is described with reference to FIGS. 1 and 4.

FIG. 5 illustrates an exemplary method 500 for DVR-based targeted advertising, and is described with reference to a network-based content provider that includes components to implement DVR-based targeted advertising as described with reference to FIGS. 1 and 4. The order in which the method is described is not intended to be construed as a limitation, and any number of the described method blocks can be combined in any order to implement the method. Furthermore, the method can be implemented in any suitable hardware, software, firmware, or combination thereof.

At block 502, a request is received to provide recorded media content. For example, the client device 120 receives a user input 122 from remote control device 124 to render a recorded program for viewing. The client device 120 then communicates the request for the recorded program to the content provider 110 via the communication network 402. At block 504, the recorded media content is provided as a first data stream to render the recorded media content for viewing. For example, content provider 110 communicates a data stream 404 of the recorded media content to the client device 120 via communication network 402 where the client device 120 can decode the data stream 404 to render the recorded program for display on television 126.

At block 506, an advertisement region boundary is detected in the first data stream of recorded media content. For example, the advertisement manager 104 monitors the data stream 404 of the recorded program and detects an advertisement region boundary that designates when an advertisement is to be separately rendered. The advertisement region may also be detected in a content navigable stream corresponding to the recorded media content when the recorded program is advanced faster than a normal playback speed (e.g., fast-forward or skip-ahead), or when the recorded program is reversed (e.g., rewind or skip-back).

At block 508, an advertisement is obtained from an advertisement data store. For example, the advertisement manager 104 obtains the advertisement from the advertisement data store 106 to target a particular viewer based on a likelihood that the viewer requested the recorded media content for viewing, such as a viewer associated with client device 120. The advertisement manager 104 may also obtain the advertisement based on a time of day, a day of the week, a location of a client device 120 that renders the recorded media content and the advertisement for viewing, and/or based on any other model (e.g., a Bayesian inference) or combination thereof.

At block 510, the advertisement is provided as a second data stream to render the advertisement for viewing. For example, content provider 110 communicates a data stream 406 of the advertisement to the client device 120 via communication network 402. The client device 120 can then decode the data stream 406 to render the advertisement for display on television 126 when the advertisement region boundary is encountered while the recorded media content is being rendered.

At block 512, the advertisements in the advertisement data store are replaced with different advertisements to target viewer(s). For example, the advertisement manager 104 can replace the advertisements and associated playback information in the advertisement data store 106 with different advertisements which can be provided to target a particular viewer or viewers associated with the television-based client device 120 (or other client devices of the system 400).

Optionally, method 500 can be repeated at 514 when a subsequent request to provide the recorded media content is received (e.g., at block 502). When a data stream of the requested, recorded media content is again provided to the client device 120, the advertisement manager 104 can again detect the advertisement region boundary in a data stream of the recorded media content (e.g., at block 506). The advertisement manager 104 can then obtain a different advertisement from the advertisement data store 106 (e.g., at block 508) such that the different advertisement is provided as a second data stream (e.g., at block 510), and such that the client device can render the different advertisement for viewing when the advertisement region boundary is encountered in the data stream of the recorded media content.

Figure 6:
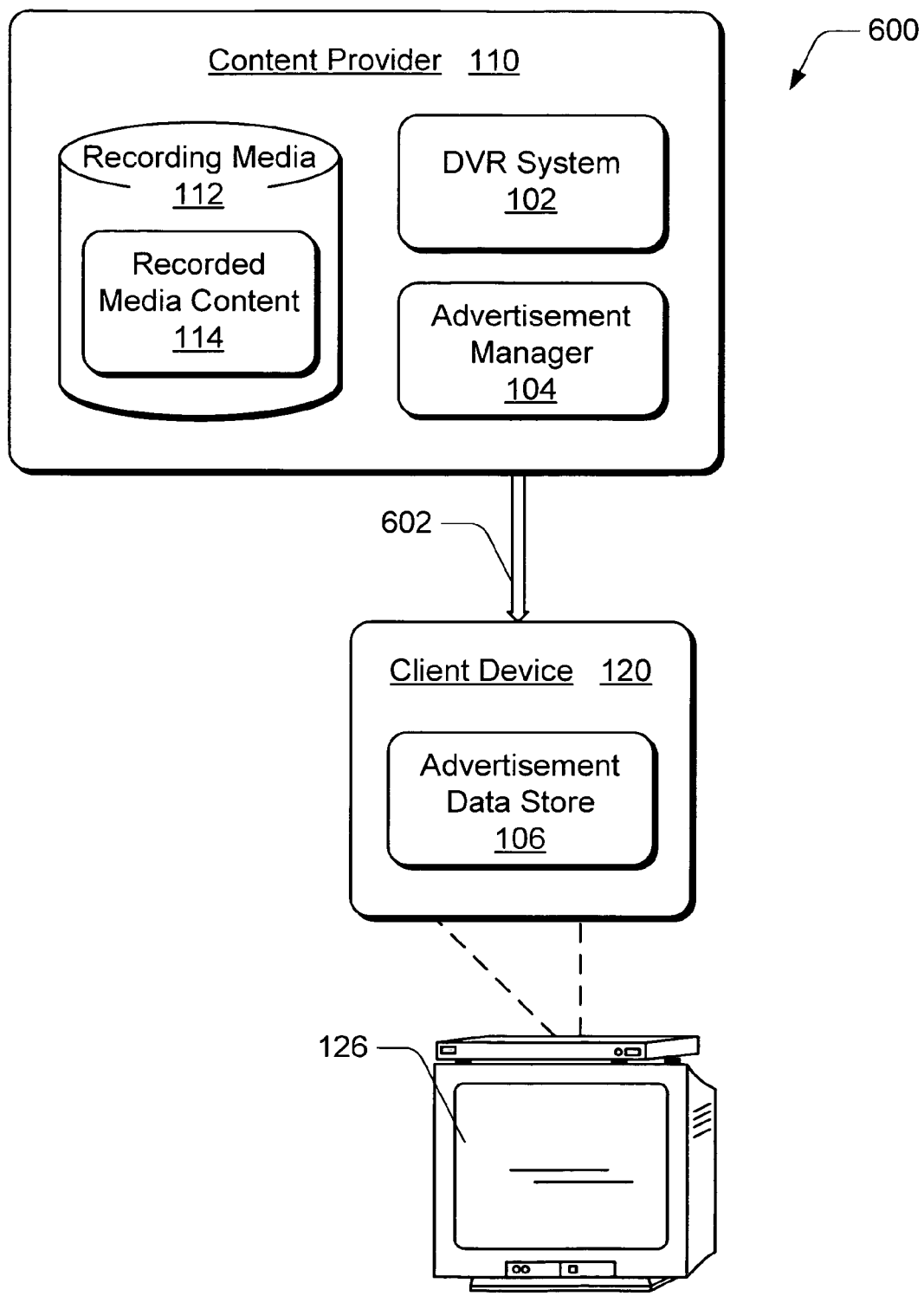
FIG. 6 illustrates an exemplary targeted advertisement system in which embodiments of DVR-based targeted advertising can be implemented with both a network-based content provider and a television-based client device.

FIG. 6 illustrates one example system 600 in which any combination of the components described with reference to the system 100 shown in FIG. 1 can be implemented in a network-based content provider 110 and/or in a television-based client device 120 to implement embodiments of DVR-based targeted advertising. In this example system 600, content provider 110 includes the DVR system 102 and the advertisement manager 104, and the client device 120 includes the advertisement data store 106.

The DVR system 102 of the content provider 110 can provide recorded media content 114 to the client device 120 via a communication network 602 when requested, such as from a viewer associated with client device 120. The client device 120 can receive the recorded media content from the content provider 110 as a data stream, and decode the data stream to render the recorded media content for viewing on television 126. The advertisement manager 104 in content provider 110 monitors the data stream of recorded media content and, when detecting an advertisement region boundary in the data stream, communicates as such to the client device 120. The client device 120 can then obtain an advertisement from the advertisement data store 106 at the client device and render the advertisement for viewing on television 126.

In this example system 600, the content provider 110 may store the associated correspondences files (such as shown in FIG. 4, item 408) as private information, and communicate to the client device 120 when to switch to a particular advertisement, as well as which advertisement will be displayed for the viewer. Alternatively, the content provider 110 may provide the client device 120 with all of the correspondences files along with an indication of which advertisements should be displayed when the corresponding advertisement regions are encountered in the media content. Alternatively, the content provider 110 may provide all of the correspondences files to the client device 120, and the client device 120 then requests an indication of which advertisement should be displayed when encountering an advertisement region boundary in the media content.

Figure 7:
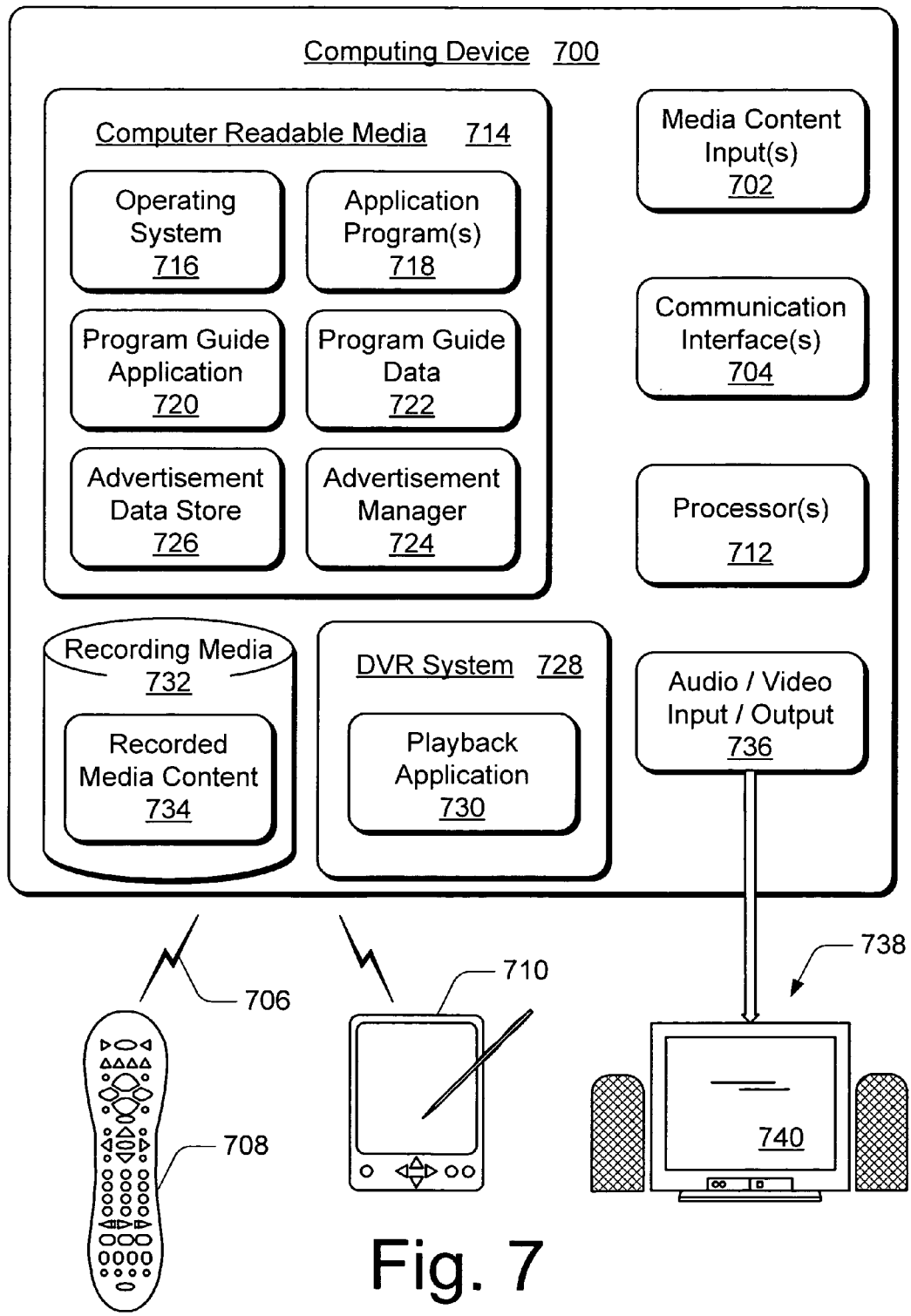
FIG. 7 illustrates various components of an exemplary computing device in which embodiments of DVR-based targeted advertising can be implemented.

FIG. 7 illustrates various components of an exemplary computing device 700 in which embodiments of DVR-based targeted advertising can be implemented. The computing device 700 can be implemented as any one or more of the electronic, computing, and client devices described herein, and as any one or more of the servers, monitors, and managers of the exemplary television-based system 800 described with reference to FIG. 8. For example, computing device 700 can be implemented with any number of the various components as the content provider 110, and/or with any number of the various components as the client device 120 with reference to any of the figures described herein.

Computing device 700 includes one or more media content inputs 702 which may include Internet Protocol (IP) inputs over which streams of media content are received via an IP-based network. Device 700 further includes communication interface(s) 704 which can be implemented as any one or more of a serial and/or parallel interface, a wireless interface, any type of network interface, a modem, and as any other type of communication interface. A wireless interface enables device 700 to receive control input commands 706 and other information from an input device, such as from remote control device 708, PDA (personal digital assistant) 710, a cellular phone, or from another infrared (IR), 802.11, Bluetooth, or similar RF input device.

A network interface provides a connection between the computing device 700 and a communication network by which other electronic and computing devices can communicate data with device 700. Similarly, a serial and/or parallel interface provides for data communication directly between device 700 and the other electronic or computing devices. A modem facilitates device 700 communication with other electronic and computing devices via a conventional telephone line, a DSL connection, cable, and/or other type of connection.

Computing device 700 also includes one or more processors 712 (e.g., any of microprocessors, controllers, and the like) which process various computer executable instructions to control the operation of device 700, to communicate with other electronic and computing devices, and to implement embodiments of DVR-based targeted advertising. Device 700 can be implemented with computer readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 714 provides data storage mechanisms to store various information and/or data such as software applications and any other types of information and data related to operational aspects of the computing device 700. For example, an operating system 716 and/or other application programs 718 can be maintained as software applications with the computer readable media 714 and executed on processor(s) 712 to implement embodiments of DVR-based targeted advertising.

For example, the computer readable media 714 includes a program guide application 720 that is implemented to process program guide data 722 and generate program guides for display which enable a viewer to navigate through an onscreen display and locate broadcast programs, recorded programs, video on-demand programs and movies, interactive game selections, and other media access information or content of interest to the viewer. The computer readable media 714 can also include an advertisement manager 724 and an advertisement data store 726 to store advertisements and to implement embodiments of DVR-based targeted advertising.

The advertisement manager 724 can be implemented as the advertisement manager 104 described with reference to any of the figures described herein. The computing device can also include a DVR system 728 with playback application 730, and recording media 732 to maintain recorded media content 734. The advertisement manager 724 and the DVR system 728 (along with the advertisement data store 726, playback application 739, and recording media 732), can implement the various features and aspects of DVR-based targeted advertising, such as described in methods 300 and 500 described with reference to respective FIGS. 3 and 5. Although the advertisement manager 724 is illustrated and described as a single application configured to implement embodiments of DVR-based targeted advertising, the advertisement manager 724 can be implemented as several component applications distributed to each perform one or more functions in a server and/or a client device in a television-based entertainment and information system.

The computing device 700 also includes an audio and/or video output 736 that provides audio and video to an audio rendering and/or display system 738, or to other devices that process, display, and/or otherwise render audio, video, and display data. Video signals and audio signals can be communicated from device 700 to a television 740 via an RF (radio frequency) link, S-video link, composite video link, component video link, analog audio connection, or other similar communication link.

Figure 8:
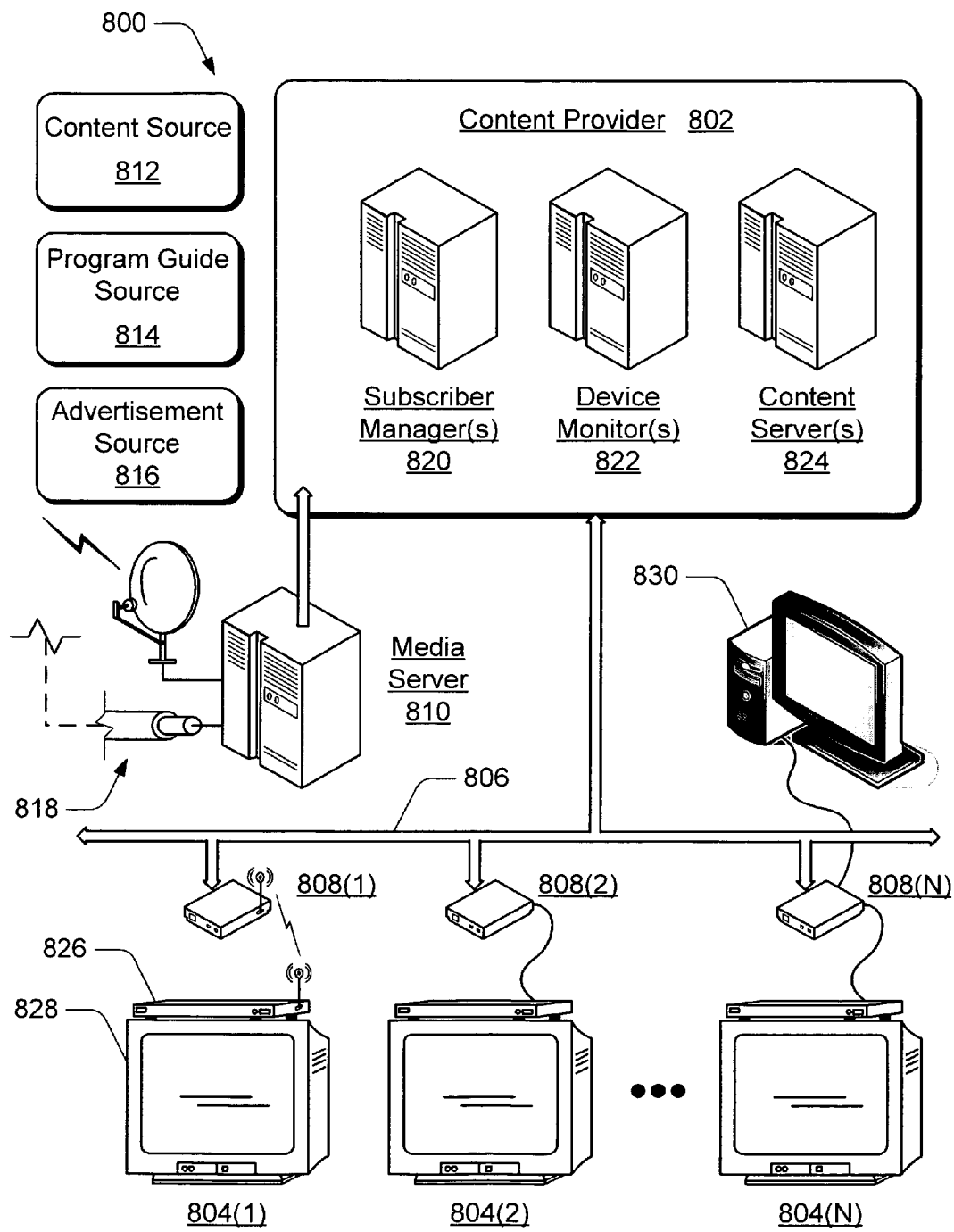
FIG. 8 illustrates various devices and components in an exemplary entertainment and information system in which embodiments of DVR-based targeted advertising can be implemented.

FIG. 8 illustrates an exemplary entertainment and information system 800 in which an IP-based television environment can be implemented, and in which embodiments of DVR-based targeted advertising can be implemented. System 800 facilitates the distribution of program content, program guide data, and advertising content to multiple viewers. System 800 includes a content provider 802 and television-based client systems 804(1-N) each configured for communication via an IP-based network 806.

The network 806 can be implemented as a wide area network (e.g., the Internet), an intranet, a Digital Subscriber Line (DSL) network infrastructure, or as a point-to-point coupling infrastructure. Additionally, network 806 can be implemented using any type of network topology and any network communication protocol, and can be represented or otherwise implemented as a combination of two or more networks. A digital network can include various hardwired and/or wireless links 808(1-N), routers, gateways, and so on to facilitate communication between content provider 802 and the client systems 804(1-N). The television-based client systems 804(1-N) receive program content, program guide data, advertising content, closed captions data, and the like from content server(s) of the content provider 802 via the IP-based network 806.

System 800 includes a media server 810 that receives program content from a content source 812, program guide data from a program guide source 814, and advertising content from an advertisement source 816. In an embodiment, the media server 810 represents an acquisition server that receives the audio and video program content from content source 812, an EPG server that receives the program guide data from program guide source 814, and/or an advertising management server that receives the advertising content from the advertisement source 816.

The content source 812, the program guide source 814, and the advertisement source 816 control distribution of the program content, the program guide data, and the advertising content to the media server 810 and/or to other television-based servers. The program content, program guide data, and advertising content is distributed via various transmission media 818, such as satellite transmission, radio frequency transmission, cable transmission, and/or via any number of other transmission media. In this example, media server 810 is shown as an independent component of system 800 that communicates the program content, program guide data, and advertising content to content provider 802. In an alternate implementation, media server 810 can be implemented as a component of content provider 802.

Content provider 802 is representative of a headend service in a television-based content distribution system, for example, that provides the program content, program guide data, and advertising content to multiple subscribers (e.g., the television-based client systems 804(1-N)). The content provider 802 can be implemented as a satellite operator, a network television operator, a cable operator, and the like to control distribution of program and advertising content, such as movies, television programs, commercials, music, and other audio, video, and/or image content to the client systems 804(1-N).

Content provider 802 includes various components to facilitate media data processing and content distribution, such as a subscriber manager 820, a device monitor 822, and a content server 824. The subscriber manager 820 manages subscriber data, and the device monitor 822 monitors the client systems 804(1-N) (e.g., and the subscribers), and maintains monitored client state information.

Although the various managers, servers, and monitors of content provider 802 (to include the media server 810 in one embodiment) are illustrated and described as distributed, independent components of content provider 802, any one or more of the managers, servers, and monitors can be implemented together as a multi-functional component of content provider 802. Additionally, any one or more of the managers, servers, and monitors described with reference to system 800 can implement features and embodiments of DVR-based targeted advertising.

The television-based client systems 804(1-N) can be implemented to include a client device 826 and a display device 828 (e.g., a television). A client device 826 of a television-based client system 804 can be implemented in any number of embodiments, such as a set-top box, a digital video recorder (DVR) and playback system, a personal video recorder (PVR), an appliance device, a gaming system, and as any other type of client device that may be implemented in a television-based entertainment and information system. In an alternate embodiment, client system 804(N) is implemented with a computing device 830 as well as a client device 826. Additionally, any of the client devices 826 of a client system 804 can implement features and embodiments of DVR-based targeted advertising as described herein.

Although embodiments of DVR-based targeted advertising have been described in language specific to structural features and/or methods, it is to be understood that the subject of the appended claims is not necessarily limited to the specific features or methods described. Rather, the specific features and methods are disclosed as exemplary implementations of DVR-based targeted advertising.

The invention claimed is:

1. A targeted advertisement system, comprising:
   a digital video recorder (DVR) configured to record media content and maintain the recorded media content for on-demand viewing, the DVR further configured to provide a first data stream of the recorded media content for viewing when requested;
   an advertisement data store configured to maintain advertisements;
   an advertisement manager configured to:
   designate one or more advertisement regions in the recorded media content as the media content is being recorded, an advertisement region including a first boundary and a second boundary to designate the advertisement region in the recorded media content;
   monitor the first data stream of recorded media content when rendered for viewing; and
   detect that a playback position of the first data stream has crossed at least one of the first boundary or the second boundary of the advertisement region, and initiate that an advertisement obtained from the advertisement data store be provided as a second data stream to render the advertisement for viewing,
   wherein the DVR is further configured, when the first data stream is displayed in reverse order as rewinding, to detect that the second boundary of the advertisement region that is crossed before the first boundary, and play back the advertisement obtained from the advertisement data store in reverse order.

2. A targeted advertisement system as recited in claim 1, wherein the DVR is further configured to detect the first boundary of the advertisement region when the media content is played back at a fast-forward speed and display the advertisement obtained from the advertisement data store at the fast-forward speed.

3. A targeted advertisement system as recited in claim 1, wherein the DVR is further configured to detect the first boundary of the advertisement region when the media content is played back at a fast-forward playback speed, display the advertisement obtained from the advertisement data store at a normal playback speed, and resume the fast-forward playback speed upon completion of the advertisement.

4. A targeted advertisement system as recited in claim 1, further comprising a network-based content provider configured to replace the advertisements in the advertisement data store with different advertisements and associated advertisement playback information, the associated advertisement playback information including metadata that indicates which advertisement is to be played back for a particular advertisement region in the media content.

5. A targeted advertisement system as recited in claim 1, wherein the advertisement manager is further configured to detect that the playback position has crossed at least one of the first boundary or the second boundary in a content navigable stream corresponding to the recorded media content when the recorded media content is at least one of advanced faster than a normal playback speed, or reversed.

6. A method, comprising:
   providing a first data stream of recorded media content to be rendered for viewing when requested, the first data stream including a designated advertisement region, wherein a designated first advertisement region boundary indicates a start of the advertisement region and a designated second advertisement region boundary indicates an end of an advertisement region;
   detecting that one of said first or second advertisement region boundaries has been encountered in the first data stream of recorded media content when the first data stream is rendered for viewing;
   obtaining an advertisement from an advertisement data store, the advertisement being provided as a second data stream to render the advertisement for viewing when the first advertisement region boundary is encountered while the recorded media content is being rendered in a forward playback mode or when the second advertisement region boundary is encountered in a reverse playback mode;
   displaying the first data stream at a fast-forward playback rate;
   detecting the first advertisement region boundary of the advertisement region; and
   displaying the advertisement obtained from the advertisement data store at the fast-forward playback rate.

7. A method as recited in claim 6, further comprising designating the advertisement region in the recorded media content while the media content is being recorded, by designating the first advertisement region boundary and the second advertisement region boundary to designate the advertisement region which identifies when the advertisement is to be rendered separately from the recorded media content.

8. A method as recited in claim 7, wherein designating the advertisement region includes detecting an inband SCTE (Society of Cable Television Engineers)-35 protocol signal in an MPEG (Moving Picture Experts Group) transport stream of the media content.

9. A method as recited in claim 6, further comprising:
   displaying the first data stream in reverse order in a rewind mode;
   detecting that the second advertisement region boundary of the advertisement region is crossed before the first advertisement region boundary; and
   displaying the advertisement obtained from the advertisement data store in reverse order.

10. A method as recited in claim 6, further comprising:
   displaying the first data stream in reverse order in a rewind mode;
   detecting that the second advertisement region boundary of the advertisement region is crossed before the first advertisement region boundary; and
   displaying the advertisement obtained from the advertisement data store at a normal playback rate.

11. A method as recited in claim 6, wherein detecting the advertisement region boundary in the first stream of recorded media includes detecting the advertisement region boundary in a content navigable stream corresponding to the recorded media content when the recorded media content is at least one of advanced faster than a normal playback speed, or reversed.

12. A method, comprising:
   designating an advertisement region in recorded media content as the media content is being recorded by a digital video recorder, wherein an advertisement region includes a first boundary and a second boundary to designate the advertisement region in the media content, the first advertisement region boundary indicating a start point of the advertisement region and the second advertisement region boundary indicating an endpoint of the advertisement region;
   receiving a request from a viewer to provide the recorded media content to render a recorded program for viewing;
   providing the recorded media content as a first data stream in response to the request;
   rendering the recorded media content for display on a display device;
   encountering the first advertisement region boundary when rendering the recorded media content for viewing in a forward playback mode and encountering the second advertisement boundary region when rendering the recorded media content in a reverse playback mode; and
   obtaining an advertisement from an advertisement data store, the advertisement being provided as a second data stream to render the advertisement for viewing in place of the first data stream as a targeted advertisement for the viewer;
   rendering the first data stream for display at a fast forward playback rate;
   detecting that the first advertisement region boundary of the advertisement region is encountered; and
   displaying the advertisement obtained from the advertisement data store at the fast-forward playback rate.

13. A method as recited in claim 12, further comprising:
   rendering the first data stream for display in reverse order in a rewind mode;
   detecting that the second advertisement region boundary of the advertisement region is encountered before the first advertisement region boundary; and
   displaying the advertisement obtained from the advertisement data store in reverse order.

14. A method as recited in claim 12, further comprising:
   rendering the first data stream for display in reverse order in a rewind mode;
   detecting that the second advertisement region boundary of the advertisement region is encountered before the first advertisement region boundary; and
   displaying the advertisement obtained from the advertisement data store at a normal playback rate.

15. A method as recited in claim 12, further comprising:
   rendering the first data stream for display in a skip mode in response to user input;
   detecting that the first advertisement region boundary of the advertisement region is encountered while the first data stream is being rendered in a skip-ahead mode or when the second advertisement region boundary is encountered in a skip-back mode; and
   displaying the advertisement obtained from the advertisement data store.

* * * * *